(12) United States Patent
Kamen et al.

(10) Patent No.: US 6,219,064 B1
(45) Date of Patent: Apr. 17, 2001

(54) GRAPHICS MECHANISM AND APPARATUS FOR MIPMAP LEVEL ESTIMATION FOR ANISOTROPIC TEXTURE MAPPING

(75) Inventors: Yakov Kamen, Cupertino; Leon Shirman, Redwood City, both of CA (US)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/114,793

(22) Filed: Jul. 13, 1998

Related U.S. Application Data (60) Provisional application No. 60/072,191, filed on Jan. 7, 1998.

(51) Int. Cl.[7] .................................................. G06T 11/40
(52) U.S. Cl. ........................................... 345/430; 345/425
(58) Field of Search ..................................... 345/425, 430

(56) References Cited

U.S. PATENT DOCUMENTS

| | | |
|---|---|---|
| 5,220,650 | 6/1993 | Barkans . |
| 5,224,208 | 6/1993 | Miller, Jr. et al. . |
| 5,287,442 | 2/1994 | Alcorn et al. . |
| 5,307,450 * | 4/1994 | Grossman ............................ 395/123 |
| 5,519,823 | 5/1996 | Barkans . |
| 5,566,284 | 10/1996 | Wakayama . |
| 5,594,846 | 1/1997 | Donovan . |
| 5,594,854 | 1/1997 | Baldwin et al. . |
| 5,606,650 | 2/1997 | Kelley et al. . |
| 5,706,481 | 1/1998 | Hannah et al. . |
| 5,710,879 | 1/1998 | Ashburn . |
| 6,005,582 * | 12/1999 | Gabriel et al. ........................ 345/430 |
| 6,008,820 * | 12/1999 | Chauvin et al. ...................... 345/502 |

OTHER PUBLICATIONS

IEEE Computer Graphics & Applications, J. Blinn, "Hyperbolic Interpolation", pp. 89–94, Jul. 1992.
Computer Graphics, F. Crow, "Summed–Area Tables For Texture Mapping", vol. 18(3), pp. 207–211, Jul. 1984.
IEEE Computer Graphics & Applications, P. Heckbert, "Survey of Texture Mapping", pp. 56–67, Nov. 1986.
IEEE Computer Graphics & Applications, N. Greene and P. Heckbert, "Creating Raster Omnimax Images From Mulitple Perspective Views Using the Elliptical Weighted Average Filter", pp. 21–27, Jun. 1986.
Addison–Wesley Publishing Company, A. Watt and M. Watt,"Advanced Animation And Rendering Techniques", pp. 140–148.
Computer Graphics, L. Williams, "Pyramidal Parametrics", vol. 17(3), pp. 1–11, 1983.
IEEE Computer Society Press, Los Alamitos, California, G. Wolberg, "Digital Image Warping", 1990.
Proc. 1997 Siggrraph/Eurographics Workshop on Graphics Hardware, A. Barkans, "High Quality Rendering Using the Talisman Architecture", pp. 79–88, Los Angeles, 1997.

* cited by examiner

*Primary Examiner*—Matthew Luu
*Assistant Examiner*—G. F. Cunningham (57) ABSTRACT

A new mipmap level estimation method that is based on the inverse of homogeneous coordinate only. This method is more efficient and more robust than the traditional approaches. In most common cases, this method handles texture anisotropy well and eliminates the need for complicated anisotropy processing.

10 Claims, 7 Drawing Sheets

GRAPHICS MECHANISM AND APPARATUS FOR MIPMAP LEVEL ESTIMATION FOR ANISOTROPIC TEXTURE MAPPING

CROSS-REFERENCE TO RELATED APPLICATIONS

This application claims priority on provisional patent application, Ser. No. 60/072,191, entitled "Graphics Mechanism and Apparatus for Mipmap Level Estimation for Anisotropic Texture Mapping," filed Jan. 7, 1998 in the names of the inventors herein and assigned to the assignee of this application. This application is related to U.S. patent application Ser. No. 08/819,312, entitled "Method and Apparatus for Adaptive Nonlinear Projective Rendering," filed Mar. 18, 1997 and U.S. patent application Ser. No. 08/971,972, entitled "Texture Mapping With Improved Technique for Selecting an Appropriate Level in Filtered Representations of the Texture," filed Nov. 17, 1997, both in the names of the inventors herein and assigned to the assignee of this application.

BACKGROUND OF THE INVENTION

1. Field of the Invention

This invention relates to features that improve the efficiency of rendering images of three-dimensional objects, and more particularly to a graphics mechanism and apparatus for mipmap level estimation for anisotropic texture mapping, wherein the mipmap estimation technique uses inverse homogenous coordinates only.

2. Description of the Related Art

Aliasing artifacts that arise due to texture mapping are well-known and have been studied by many researchers (see, e.g., [1] A. Watt, "3D Computer Graphics," 2nd edition, Addison-Wesley, 1993 and [2] G. Wolberg, "Digital Image Warping," IEEE Computer Society Press, Los Alamitos, Calif., 1990). Various filtering schemes can be used to deal with this problem (see, e.g., [3] F. Crow, "Summed Area Tables for Texture Mapping", Computer Graphics, 18(3), pp. 207–212, 1984 and [4] N. Greene and P. Heckbert, "Creating Raster Omnimax Images Using the Elliptically Weighted Average Filter," Computer Graphics and Applications, pp. 21–27, June 1986). However, by far the most popular filtering scheme is mipmapping ([5] L. Williams, "Pyramidal Parametrics," Computer Graphics, 17(3), pp. 1–11, 1983). In this method, the original texture is averaged down to successively lower resolutions, each image in the mipmap sequence being one half of the resolution of the previous image. Then, instead of always using the original texture map, an appropriately scaled image is used.

Mipmapping as a technique has several disadvantages. The first inevitable disadvantage is an increase of memory requirements space by 33% [5]. Second, it is necessary to choose an appropriate level of pyramid each time texture mapping is applied ([6] P. Heckbert, "Texture Mapping Polygons in Perspective," Tech. Memo No. 13, NYIT Computer Graphics Lab, April 1983 and [5]). Good selection of mipmap level is key to proper filtering and therefore is very important for image quality, as discussed in U.S. patent application Ser. No. 08/971,972, entitled "Texture Mapping With Improved Technique for Selecting an Appropriate Level in Filtered Representations of the Texture," filed Nov. 17, 1997. Finally, the third disadvantage is due to the possible anisotropy artifact, because, by original construction, mipmapping cannot adequately handle situations where the ratio of either texture or screen dimensions of a surface is significantly different from one.

Various texture mapping techniques have been proposed. For the most part, these techniques do not compute mipmap levels and/or do not address the issue of anisotropy. One such technique is set forth in U.S. Pat. No. 5,224,208. This technique is embodied in a method and apparatus for calculating the gradients of texture map parameters in perspective space. The technique provides a way to calculate a texture gradient in the direction of viewing. This gradient is then used to calculate a pre-filtered textured value. This approach is dependent on viewpoint distance but has a relatively complicated implementation scheme and also does not address texture anisotropy.

OBJECTS OF THE INVENTION

Therefore, it is an object of this invention to overcome the aforementioned problems.

It is another object of this invention to provide a technique for computing mipmap levels based on inverse homogenous coordinates only.

It is a further object of this invention to provide a mipmap estimation technique using inverse homogenous coordinates which also takes into account texture anisotropy, thereby eliminating the need for complicated anisotropy processing.

SUMMARY OF THE INVENTION

In one aspect of the invention, a method is provided for selecting a mipmap level for each pixel in an object, in world and screen coordinate space, with compensation for an anisotropy effect. The method comprises the following steps: calculating, for the entire object, in world coordinate space, a binding anisotropy coefficient; calculating a first value as a minimum of a function that defines a mipmap level for the entire object as a function of a viewing transformation angle; assigning a value of the function as the first value, if the binding anisotropy coefficient is larger than a critical number such that the binding anisotropy is so high there is no practical solution to minimize; calculating an angle of viewing transformation, if the binding anisotropy coefficient is smaller than the critical number; calculating a second value indicative of the current mipmap level; calculating, for each scanline, an inverse of a first homogeneous coordinate of the corresponding scanline and an inverse of a last homogeneous coordinate of the corresponding scanline; calculating, for each pixel of each scanline, an inverse homogeneous coordinate by interpolating the inverse of the first homogeneous coordinate of the corresponding scanline and the inverse of the last homogeneous coordinate of the corresponding scanline; and calculating the level of the mipmap as a function of at least the calculated inverse homogeneous coordinates.

The method may be embodied in the form of software that may be stored on an appropriately configured computer system. Such software may also be stored on a computer usable medium such as a floppy disk or CD ROM and may transferred to a suitable computer system for execution. The method may also be embodied in the form of hardware that is incorporated into an appropriately configured computer system.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

In analyzing several existing methods of mipmap level estimation, we show that despite the apparent formulation differences of the methods, all of them depend on the interpolated inverse homogeneous coordinate. Further, we describe a new model that is a function of an inverse homogeneous coordinate only and test its effectiveness, including performance and quality.

In addition, we address the problem of anisotropy of texture mapping. We propose to classify anisotropy into two categories, one that is due to original texture binding, and the other that is due to perspective viewing transformations. We show that in the latter case, anisotropic texture mapping can be replaced, without noticeable quality degradation, with an improved mipmapping scheme with a better choice of mipmap level. This scheme can be considered as the cost effective alternative to the special anisotropic texture mapping methods. In the former case, we recommend that texture binding be altered a priori to eliminate the anisotropy. We base this recommendation on experimentally obtained statistical data from various Direct3D based applications.

Existing mipmap level estimation methods include derivative-based methods and area estimation. Mipmap level estimation using these methods is based on the relationship between screen and texture coordinates, namely, on the mapping from screen to texture coordinates u=u(x,y) and v=v(x,y).

With respect to the derivative-based methods, consider an axis-aligned unit square (i.e. pixel) in screen space with lower left coordinates $(x_0, y_0)$. According to Taylor expansion to the first order, $$u(x, y) = u(x_0, y_0) + \frac{\partial u}{\partial x}(x - x_0) + \frac{\partial u}{\partial y}(y - y_0) + O(x - x_0, y - y_0)$$

and similarly for v. Therefore, the bottom and left sides of the unit square will map approximately to vectors $$\left(\frac{\partial u}{\partial x}, \frac{\partial v}{\partial x}\right) \quad \text{and} \quad \left(\frac{\partial u}{\partial y}, \frac{\partial v}{\partial y}\right)$$

respectively. Heckbert ([6]) suggests the following maximum length formula for mipmap level estimation:

$$d = \log\left(\max\left(\sqrt{\left(\frac{\partial u}{\partial x}\right)^2 + \left(\frac{\partial v}{\partial x}\right)^2}, \sqrt{\left(\frac{\partial u}{\partial y}\right)^2 + \left(\frac{\partial v}{\partial y}\right)^2}\right)\right) \quad (1)$$

where log is taken to the base 2, as are all logarithms set forth throughout the remainder of this discussion. In geometric terms, this simply means selecting the larger of the Euclidean lengths of the two vectors $$\left(\frac{\partial u}{\partial x}, \frac{\partial v}{\partial x}\right) \quad \text{and} \quad \left(\frac{\partial u}{\partial y}, \frac{\partial v}{\partial y}\right)$$

for mipmap computation.

The above formulation is somewhat arbitrary. Instead of taking Euclidean norm, it is possible to take Manhattan or max norms; instead of taking the larger length, we could consider average length, etc.

Figure 1:
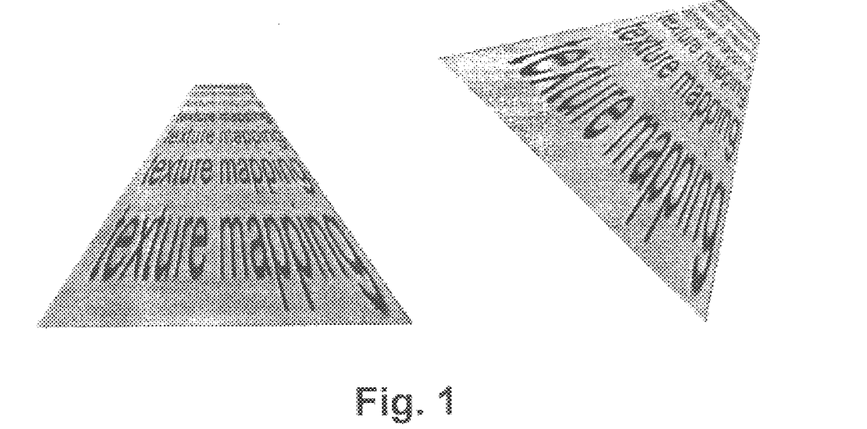
FIG. 1 is mipmap level distribution for the maximum length method.

In addition to the problem of choosing a norm in texture space, the above method has other serious drawbacks. First, calculation of partial derivatives of u and v per pixel is required. This is expensive. Second, derivative-based methods are not invariant to rigid transformations in the screen space, such as rotations and mirror images. FIG. 1 shows a pair of perspectively distorted, trilinearly mipmapped triangles in two different orientations. Mipmap level distribution according to the maximum length model is superimposed on the texture map. Each shaded region corresponds to an integer mipmap level (i.e. from 1 to 2, from 2 to 3, etc.). This dependence of mipmap levels on triangle orientation could create visible artifacts during animation.

In U.S. patent application Ser. No. 08/971,972, entitled "Texture Mapping With Improved Technique for Selecting an Appropriate Level in Filtered Representations of the Texture," filed Nov. 17, 1997, the inventors proposed the *Invariant Derivatives* method that is orientation-independent. In this method, partial derivatives are integrated for all possible directions, yielding the following formula:

$$d = \frac{1}{2}\log\left(\frac{1}{2}\left(\left(\frac{\partial u}{\partial x}\right)^2 + \left(\frac{\partial u}{\partial y}\right)^2 + \left(\frac{\partial v}{\partial x}\right)^2 + \left(\frac{\partial v}{\partial y}\right)^2\right)\right) \quad (2)$$

Figure 2:
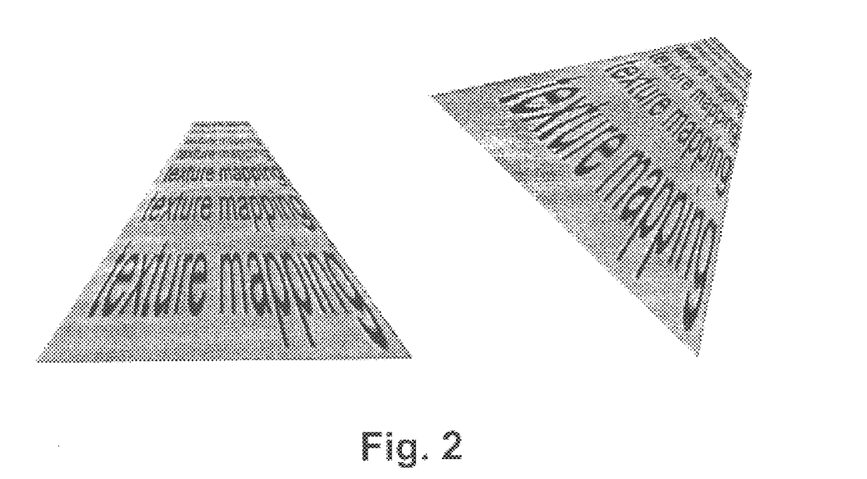
FIG. 2 is a mipmap level distribution for the invariant derivatives method.

This distribution is invariant under rigid transformations (FIG. 2).

As previously noted, another mipmap level estimation method is area estimation. Together with Heckbert's method, the area estimation method is relatively well-known and described in literature [1]. The idea of the method is very simple. Instead of computing partial derivatives of u and v and subsequently ignoring higher-order terms of the Taylor expansion, we compute the area a of the quadrilateral in the texture space that the current pixel maps to. Then the mipmap level is $$d = \log(\sqrt{a}) = \tfrac{1}{2} \log(a) \qquad (3)$$

Figure 3:
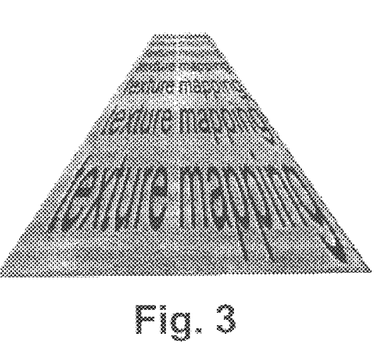
FIG. 3 is a mipmap level distribution for the area estimation method.

FIG. 3 shows mipmap level distribution using this model. By construction, the distribution is clearly invariant under rigid transformations. Another interesting property of this method is that mipmap level is constant along q=const lines, where q is linearly interpolated among the inverses of the homogeneous coordinates at three triangle vertices. This is because along these lines the mapping from screen to texture space is linear ([7] J. Blinn, "Hyperbolic Interpolation", Computer Graphics and Applications, pp. 89–94, July 1992) and therefore pixels map into quadrilaterals with the same area (this is not exactly true, as pixels have non-zero size, but since that size is typically very small compared to the whole image, we can make the assumption that q=const for the whole pixel). Once again, efficiency is a drawback of this method; it is expensive to calculate the area of the image of each pixel in texture coordinates. This is even more costly than calculating partial derivatives for previously described schemes.

Despite their apparent differences, all of the methods discussed above can be described using the inverse homogeneous coordinates q=1/w. Further, we describe a new mipmap estimation technique (the inverse w method) that depends on q only. The new technique is described below.

Many of the existing methods previously discussed rely on partial derivatives of u(x,y) and v(x,y). These derivatives are usually computed numerically in practical implementations; however, a closed-form solution can be easily derived. Consider a horizontal (y=const) scanline with endpoints $x_0$ and $x_1$, u values $u_0$ and $u_1$, and weights $w_0$ and $w_1$. Then $$u(x) = \frac{u_0/w_0 + t(u_1/w_1 - u_0/w_0)}{1/w_0 + t(1/w_1 - 1/w_0)}, t = \frac{x - x_0}{x_1 - x_0}$$

Differentiating, we obtain $$u'(x) = \frac{u'(t)}{x_1 - x_0} = \frac{u_1 - u_0}{x_1 - x_0} \frac{w_0 w_1}{(w_1 + t(w_0 - w_1))^2}$$

However, since $w(t) = w_0 + t(w_1 - w_0)$, then $$u'(x) = \frac{u_1 - u_0}{x_1 - x_0} \frac{w_0 w_1}{(w_0 + w_1 - w)^2} \qquad (4)$$

Thus, within each scanline, the partial derivative along the scanline depends only on the homogeneous coordinate. A similar result obviously holds for vertical scanlines, and, in fact, for arbitrary directions.

The above expression can be rewritten in terms of inverse w as follows:

$$q(t) = \frac{1}{w_0} + t\left(\frac{1}{w_1} - \frac{1}{w_0}\right)$$

so that $$u'(x) = \frac{u_1 - u_0}{x_1 - x_0} \frac{1}{q^2 w_0 w_1} = \frac{u_1 - u_0}{x_1 - x_0} \frac{q_0 q_1}{q^2} \qquad (5)$$

where $q_0 = 1/w_0$ and $q_1 = 1/w_1$. This formulation is more convenient for practical use, because it is the inverse homogeneous coordinate q, not w, that needs to be interpolated for the perspective division [7].

These expressions for partial derivatives can be used to derive closed-form expressions for mipmap level using the previously described derivative-based methods. For example, Heckbert's formula (1) simplifies to $$d \max(\log(A_x) - 2 \log(q), \log(A_y) - 2 \log(q))$$

where $$A_x = \sqrt{\frac{(u_1^x - u_0^x)^2 + (v_1^x - v_0^x)^2}{(x_1 - x_0)^2}} \, q_0^x q_1^x \quad \text{and}$$

$$A_y = \sqrt{\frac{(u_1^y - u_0^y)^2 + (v_1^y - v_0^y)^2}{(y_1 - y_0)^2}} \, q_0^y q_1^y$$

The superscript x or y denotes the fact that u, v, and q values are taken from endpoints of horizontal or vertical scanlines, respectively.

Similarly, invariant derivatives computation (2) can be expressed as $$d = C - 2 \log(q)$$

where C depends on two components, one constant along horizontal and the other constant along vertical scanlines:

$$C = \sqrt{\tfrac{1}{2}(A_x^2 + A_y^2)}$$

This result allows a faster practical implementation.

Even though both maximum length and invariant derivatives methods depend on q, strictly speaking, they are not functions of q only. In fact, evaluation of per scanline quantities $A_x$, $A_y$, or C accounts for most of computation cost. On the other hand, area estimation method (discussed previously) relies just on the inverse w. This leads us to our next model, where the mipmap level for the whole triangle is a function of q only. We derive the formulation of this model from the equation (5).

If we were considering mipmap level estimation in one dimension, then we could do so in terms of the derivative u'(x) as follows:

$$d = \log(|u'(x)|)$$

$$= \log\left(\left|\frac{u_1 - u_0}{x_1 - x_0}\right|\right) + 2 \log(\sqrt{q_0 q_1}) - 2 \log(q)$$

$$= d_{ave} + 2 \log(q_{ave}) - 2 \log(q)$$

where $d_{ave}$ is the average mipmap level for the whole line segment, and $q_{ave}$ is the geometric average of $q_{st}$ and $q_{finish}$, the inverse w's at the endpoints of the line segment. Generalizing into two dimensions, we have:

$$d = d_{ave} + 2 \log(q_{ave}) - 2 \log(q), \; q_{ave} = \sqrt[3]{q_0 q_1 q_2} \qquad (6)$$

where $d_{ave}$ is the average mipmap level for the whole triangle (discussed below), $q_{ave}$ is the geometric mean of inverse w's at the triangle vertices, and q is the interpolated inverse w. This inverse w method has a clear geometric interpretation. First, we calculate the average mipmap level for the whole triangle. Then, we assume that this level is reached at some interior point within the triangle. Since we are calculating log(q), it is natural to assume that at this point, log(q) is the average of logs at triangle vertices:

$$\log(q_{ave}) = \frac{1}{3}(\log(q_0) + \log(q_1) + \log(q_2))$$

$\log(q_{ave}) = \frac{1}{3}(\log(q_0)+\log(q_1)+\log(q_2))$

In other words, $g_{ave}$ is the geometric mean of the inverse w's:

$$q_{ave} = \sqrt[3]{q_0 q_1 q_2}.$$

The average mipmap level for the whole triangle can be computed using a variety of ways, for example by calculating the ratio of areas in texture and screen spaces $$d_{ave} = \frac{1}{2}\log\left(\frac{A_T}{A_S}\right)$$

or by computing the ratio of triangle perimeter lengths in the same spaces:

$$d_{ave} = \log\left(\frac{P_T}{P_S}\right)$$

Figure 4:
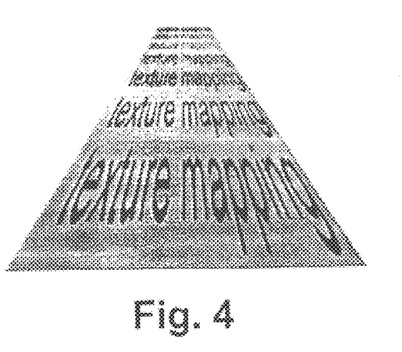
FIG. 4 is a mipmap level distribution for the inverse w method of the present invention.

FIG. 4 shows distribution of mipmap levels using inverse w method. By construction, mipmap level is constant along q=const lines within each triangle. Note, however, that since $$C = d_{ave} + 2 \log(q_{ave}) \quad (7)$$

is determined per triangle, mipmap levels could be shifted across triangle boundaries. This property is acceptable. In fact, even though other methods described above preserve mipmap level continuity for a pair of coplanar triangles, they do not guarantee it for more complex objects. A discussion on how mipmap level continuity can be achieved is set forth in U.S. patent application Ser. No. 08/971,972, entitled "Texture Mapping With Improved Technique for Selecting an Appropriate Level in Filtered Representations of the Texture," filed Nov. 17, 1997, the disclosure of which is incorporated by reference herein.

Unlike the other approaches discussed above, the inverse w method is very efficient. The only computations per pixel required are a subtraction, a shift (multiplication by 2) and calculation of log(q). The logarithm function can be efficiently implemented with a lookup table (LUT). Further, we found that for vast majority of triangles in practical applications, it is acceptable to simply compute C−2 log(q) at the triangle vertices, and then perform linear interpolation for interior pixels. That way, mipmap level estimation simply becomes another triangle interpolant, such as screen and texture coordinates, color, etc. In the case when interpolation is not accurate enough, i.e. when the triangle has high w ratio among its vertices and therefore spans several mipmap levels, it is always possible to subdivide the triangle so that w ratios for subtriangles are appropriately reduced, as discussed in U.S. patent application Ser. No. 08/819,312, entitled "Method and Apparatus for Adaptive Nonlinear Projective Rendering," filed Mar. 18, 1997, the disclosure of which is incorporated herein by reference.

Turning now to the issue of anisotropic texture mapping, we first provide an overview of existing methods. Anisotropy occurs if the ratio of the norms of partial derivatives of u(x,y) and v(x,y) along two different directions is different from one. From elementary calculus, a partial derivative of u along direction s=[cos(α), sin(α)] is given by $$\frac{\partial u}{\partial s} = \frac{\partial u}{\partial x}\cos(\alpha) + \frac{\partial u}{\partial y}\sin(\alpha)$$

and similarly for v. Thus, anisotropy can be measured as follows:

$$A = \frac{\max\left\|\frac{\partial u}{\partial s}, \frac{\partial v}{\partial s}\right\|}{\min\left\|\frac{\partial u}{\partial s}, \frac{\partial v}{\partial s}\right\|} \quad (8)$$

Euclidean as well as other norms in the two-dimensional texture space can be used in the above equation.

Mipmapping techniques rely on uniform sampling of texture map in all directions and therefore are not able to handle anisotropy well. It results in possible quality degradation after mipmap filtering. The straightforward solution is to use multiple sampling of texture mapping in several directions, and to create "mipmapping hyper-pyramid" which can be controlled by an additional parameter [6]. Unfortunately, this method requires a tremendous amount of texture mapping memory, which is practically very expensive and therefore unrealistic.

A different solution, elliptically-weighted averaging (EWA) filtering procedure, was proposed in [4]. This method results in good visual quality and it is memory efficient. However, EWA requires complicated floating point computations for each pixel in the screen coordinate space, which makes it computationally inefficient.

A new modification of mipmapping filtering scheme for anisotropy handling has been recently proposed in [8] A. Barkans, "High Quality Rendering Using the Talisman Architecture", pp. 79–88, Proc. 1997 Siggraph/Eurographics Workshop on Graphics Hardware, Los Angeles, 1997. This scheme finds the direction of the maximum partial derivative, and, along this direction, samples and averages several appropriate mipmaps computed using the minimum partial derivative. This method has a number of benefits compared to other solutions and necessary interfaces have already been added in the 1998 release of Microsoft Direct3D, Version 6.0. However, efficiency is once again a problem. While improving image quality, this solution is an order of magnitude more complex than traditional mipmapping., because several additional filtering operations need to be performed per each pixel in screen coordinate space.

Note that there are non-mipmapping related filtering methods, such as summed-area tables [3] that address texture anisotropy. However, making mipmapping handle anisotropy well is very important, because of de-facto standard of mipmapping as filtering technology of choice in hardware, software, and various graphics application programming interfaces (APIs).

The inverse w method presented above is a "pure" mipmapping technique and therefore theoretically it cannot handle anisotropic texture mapping. However, as we will show below, this method can substitute for anisotropic texture mapping with acceptable results for most practical applications.

Anisotropy is an artifact which can be created at two different stages of the texture mapping pipeline. At the first stage, several key points of a texture are assigned (or bound)

to the corresponding points on a geometrical object located in the world coordinate space. At the second stage, the geometrical object is transformed to the screen coordinate space and all other points are textured based on interpolation of texture coordinates. We believe that these two different stages generate two different anisotropic artifacts. Binding process is usually a human-dependent operation. In general it is more an art than a science, whether it is created manually by an artist or semi-automatically by modeling software. Anisotropy artifacts in binding are results of mistakes, software inefficiencies, or even special visual effects. We call it anisotropy of binding. On the other hand, transformation from the world to the screen coordinates is purely a formal operation. An anisotropy of viewing distortion is due to the effect of perspective viewing transformations, which can be studied in detail. Finally, total anisotropy is caused by both of the above reasons.

We believe that it is almost always possible, if necessary, to change the binding in the world coordinates to eliminate the anisotropy of binding. This is probably a good design practice anyway. For example, modeling applications often assign texture coordinates to vertices in such a manner as to maintain the constant "stretching" of the texture map on the object surface. Then, texture appears to be naturally painted on the surface without distortions. This precludes any possibility of anisotropy of binding. Another solution is to remodel a geometrical object to minimize binding anisotropy. However, it is not clear how to formalize this process without a human interaction.

Assume that binding is done properly and therefore there is no anisotropy of binding. If, after a transformation from the world to the screen coordinates, textured surface is oriented parallel to the view screen, clearly no anisotropy processing is needed. As the surface is rotated toward or away from the eye point, anisotropy increases. The maximum anisotropy is achieved when the textured surface is oriented orthogonal to the view screen. The key point here is, as the anisotropy effect increases, so does the surface distortion due to view, and lower quality becomes acceptable! In essence, these two effects tend to compensate each other.

Figure 5:
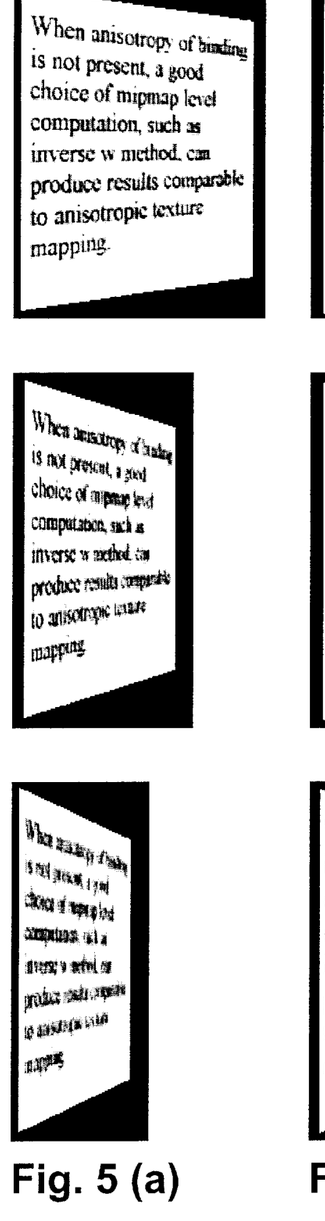
FIG. 5(a) depicts textured surfaces at various viewing angles using the maximum length method.
FIG. 5(b) depicts textured surfaces at various viewing angles using the inverse w method of the present invention.
FIG. 5(c) depicts textured surfaces at various viewing angles using anisotropic texture mapping.

FIGS. 5(a), 5(b) and 5(c) show a textured surface, viewed from various angles. The three images in each column a, b and c correspond to the maximum length method of mipmap level estimation, the inverse w method, and the anisotropic texture mapping from [8]. We can see that a good choice of mipmap level in inverse w method results in quality comparable to anisotropic texturing.

Even better quality can potentially be achieved by experimental selection of mipmap levels. Instead of using equation (7), we can approximate average mipmap level for a triangle as follows:

$$C = C_0 + f(\alpha)$$

where $C_0$ is the mipmap level when the triangle is oriented parallel to the view screen, and $f(\alpha)$ is some function of the angle between the plane of the triangle and the view screen. Clearly, $f(0)=0$. Using inverse w method with area estimation, $f(\pi/2)$ is positive infinity, because the area of the triangle in the screen coordinates at this orientation is 0. Thus, the maximum mipmap level is used, which represents the average color of the image. This may not be the best choice, however. In many cases, a finite quantity of $f(\pi/2)$ is preferable.

Experimentally, we found that linear interpolation between 0 and some mipmap level, such as 4, for $f(\alpha)$ usually produces good results. The actual choice for $f(\alpha)$ appears to be image-dependent. For example, for high-frequency images, such as text, lower values of $f(\alpha)$ are preferable. This situation is similar to JPEG lossy compression which is tuned-up for specific images. Finding precise mathematical formulations for $f(\alpha)$ is an open research issue.

To determine what kind of anisotropy is more common, we have implemented an information-gathering tool that collects various data (such as triangle sizes, w ratios, texture anisotropy, etc.) about each triangle in each frame for a given application. We ran this tool on a number of popular benchmarks and computer games. In this tool, we calculate zero-normalized anisotropy of binding of a triangle as follows:

$$A_\Delta = \left| \frac{l_{max}^{wc}}{l_{min}^{wc}} \cdot \frac{l_{min}^{tc}}{l_{max}^{tc}} - 1 \right| \tag{9}$$

where $l_{max}$ and $l_{min}$ are the maximum and the minimum lengths of triangle sides in the world and the texture spaces. Total anisotropy is calculated analogously, with the world coordinates replaced by the screen coordinates. Then, anisotropy of viewing is simply the difference between total and binding anisotropies. In eq. (9), anisotropy is calculated per triangle, and therefore it is different from formal definition (8). However, the precision is acceptable after sampling and averaging thousands of triangles per frame.

Figure 6:
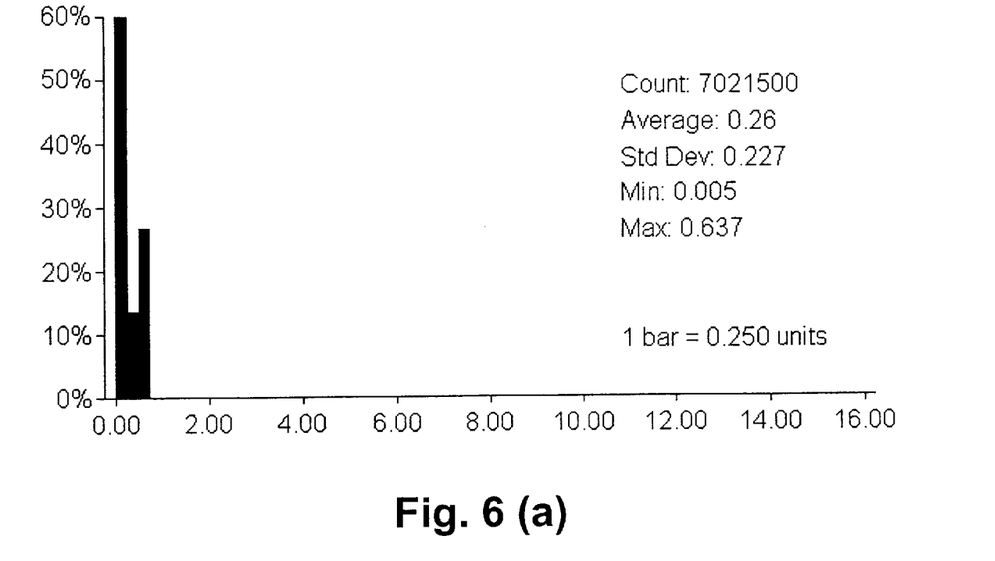
FIG. 6(a) is a histogram showing the total anisotropy for the WinBench98 application.
FIG. 6(b) is a histogram showing the total anisotropy for the "Monster Truck Madness" application.

We have tested two very different applications: WinBench98 (first 10000 frames) and "Monster Truck Madness" game from Microsoft (first 1500 frames of the demo mode). FIGS. 6(a) and 6(b) show histograms of distributions of anisotropy of binding and viewing for these applications. For WinBench98, anisotropy of binding is almost nonexistent (less then 0.05), as shown in FIG. 6(a). For "Monster Truck Madness", the picture is totally opposite: anisotropy of binding varies significantly up to 12000, as shown in FIG. 6(b). The interpretation of this artifact is simple. In Winbench98 all textures are of similar size and are bound almost always exactly to the size of triangles in the world coordinate space. This helps to test hardware parameters. On the other hand, "Monster Trucks Madness" game often assigns very thin and long texture strips to triangles in the world coordinate space. The anisotropy of viewing in both cases is very similar: average ratio is about 0.25 and maximum ratio is 0.7. This may seem surprising at the first glance; however, this confirms the point that anisotropy of viewing is due to the formal transformation process and therefore is largely independent of the application content.

As can be seen, anisotropy of binding could be by far the biggest contributor to total anisotropy. Also, it is clear that no practical filtering scheme can handle very high anisotropic ratios, such as present in "Monster Truck Madness". Thus, proper texture binding in the world coordinates remains extremely important for image quality, and should be a significant consideration in the application design process. If that is the case, inverse w method can adequately handle most practical situations.

As the foregoing demonstrates, various mipmap level computation methods and anisotropy artifacts have been studied and considered. For mipmap level computation, we have investigated current techniques and discussed their advantages and drawbacks. We have shown that partial derivatives along any given direction depend on the interpolated inverse of homogeneous coordinates. This allowed us to derive simple closed-form expressions for derivative-based methods. More importantly, that lead us to a new conceptual model of computing the mipmap level based on the inverse homogeneous coordinates only. This approach is extremely efficient and possesses various desirable properties.

Further, we have classified texture anisotropy into two categories, anisotropy of binding, and anisotropy of viewing. The former one is essentially a design issue, and can usually be eliminated at modeling stage. The latter one is due to perspective viewing transformations. We have experimentally shown that the inverse w method, while being significantly more efficient than traditional mipmapping schemes, and therefore at least an order of magnitude than true anisotropic techniques, can adequately handle this case without compromising the quality.

The case when both kinds of, anisotropy are present requires more research. However, using proper texture binding design, it is often possible to eliminate anisotropy of binding. Then, given a judicious choice of proper mipmap levels, time-consuming and complicated anisotropy processing simply becomes unnecessary.

Figure 7:
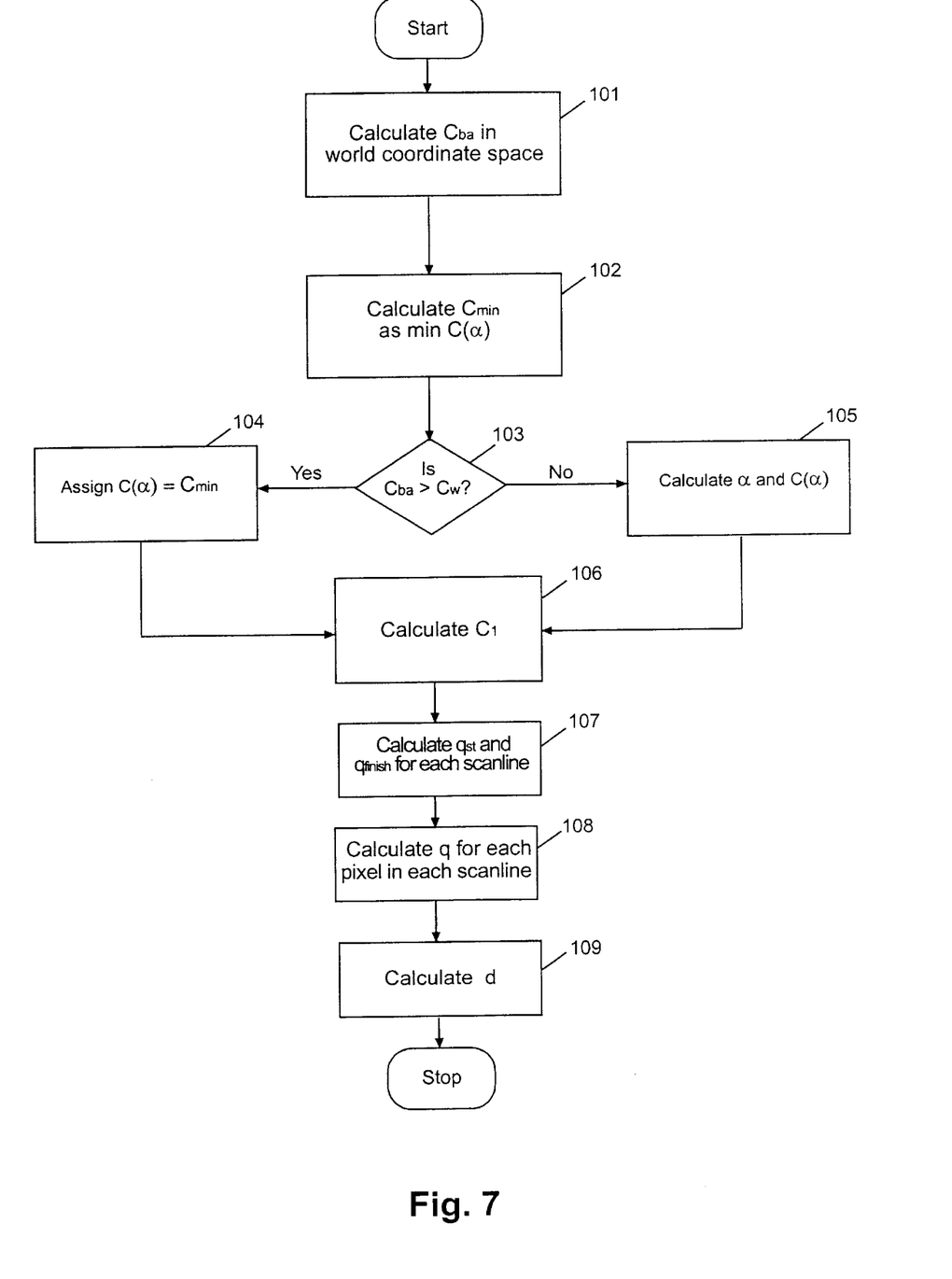
FIG. 7 is a flow diagram depicting the implementation of the inverse w mipmap level estimation technique of the present invention.

FIG. 7 is a flow diagram depicting the implementation of the inverse w mipmap level estimation technique of the present invention. It should be noted that the flow diagram is used to illustrate the performance of certain specified functions and relationships thereof. The boundaries of these functional blocks have been arbitrarily defined herein for the convenience of description. Alternate boundaries may be defined so long as the specified functions and relationships thereof are appropriately formed. Moreover, the flow diagram does not depict syntax or any particular programming language. Rather, it illustrates the functional information one skilled in the art would require to fabricate circuits or to generate software to perform the processing required. Each of the functions depicted in the flow diagram may be implemented, for example, by software instructions, digital processing circuits, and application specific integrated circuits (ASICs) or combinations thereof.

Referring to FIG. 7, an algorithm for selecting a mipmap level for each pixel in an object, such as a polygon, in world and screen coordinate space, with necessary compensation for the anisotropy effect is shown. The algorithm begins in step 101 wherein a binding anisotropy coefficient ($C_{ba}$) is experimentally calculated, for the entire object, in world coordinate space. $C_{ba}$ varies from image to image and may be experimentally determined, for example, based on a set of images which represent the anisotropy quality spectrum of the object for which $C_{ba}$ is determined. In step 102, $C_{min}$ is calculated as $minC(\alpha)$ for all a wherein $minC(\alpha)$ is the minimum value of $C(\alpha)$, the latter of which defines the mipmap level for the entire object as a function of a viewing transformation angle $\alpha$. In step 103, it is determined whether or not $C_{ba}$ is larger than a critical number ($C_w$) such that $C_{ba}$ is so high there is no practical solution to minimize the mipmap level. $C_w$ is experimentally determined and may, for example, be calculated as an average of the variation of luminance from pixel-to-pixel. If $C_{ba}$ is larger than $C_w$, then values, then assign $C(\alpha)=C_{min}$ in step 104. If $C_{ba}$ is not larger than $C_w$, then the angle of viewing transformation $\alpha$ and $C(\alpha)$ are calculated in screen coordinate space in step 105. $C(\alpha)$ may be determined from a predefined look-up table (LUT). Following either step 104 or 105 the algorithm proceeds to step 106 where $C_1$, which represents the current mipmap level or the mipmap level of the last pixel, is calculated in screen coordinate space. In step 107, $q_{st}$ and $q_{finish}$ are calculated for each scanline in screen coordinate space, wherein $q_{st}$ is the inverse of a first homogeneous coordinate in the corresponding scanline and $q_{finish}$ is the inverse of the last homogeneous coordinate of the corresponding scanline. In step 108, the inverse homogeneous coordinate q is calculated for each pixel in each scanline by interpolating the corresponding $q_{st}$ and $q_{finjsh}$ values. Then the level of the mipmap d is calculated in step 109 as a function of at least q. The level of the mipmap for the current pixel may be calculated as follows: $d=C(\alpha)-C_1 \log(q)$; $d=tB_0+(1-t)B_1-C_1 \log(q)$, wherein t is a normalized interpolation parameter between 0 and 1, and $B_0$ and $B_1$ represent respective mipmap levels for the entire object at selected $\alpha$ values; $d=C(min(w_0, \ldots, w_n)/max(w_0, \ldots, w_n))-C_1 \log(q)$ or $d=(min(w_0, w_1, W_2)/max(w_0, W_1, W_2))B_0+(1-min(w_0, w_1, W_2)/max(w_0, w_1, W_2))B_1-C_1 \log(q)$, wherein $w_0, \ldots, w_n$ are homogenous coordinates of the object's vertices 0, 1, ..., n.

The techniques of the present invention may be carried out on a computer system. In typical computer applications, such techniques may be performed by devices such as display controllers, implemented in software executed by system processors, or implemented in a wide variety of other ways including a combination of processes performed by display controllers and software-controlled system processors. The present invention is not limited to any particular computer architecture and may be practiced in devices such as video monitors or television receivers which generally are not regarded as computers. The present invention could also be used in printing applications which render images using an array of dots.

Figure 8:
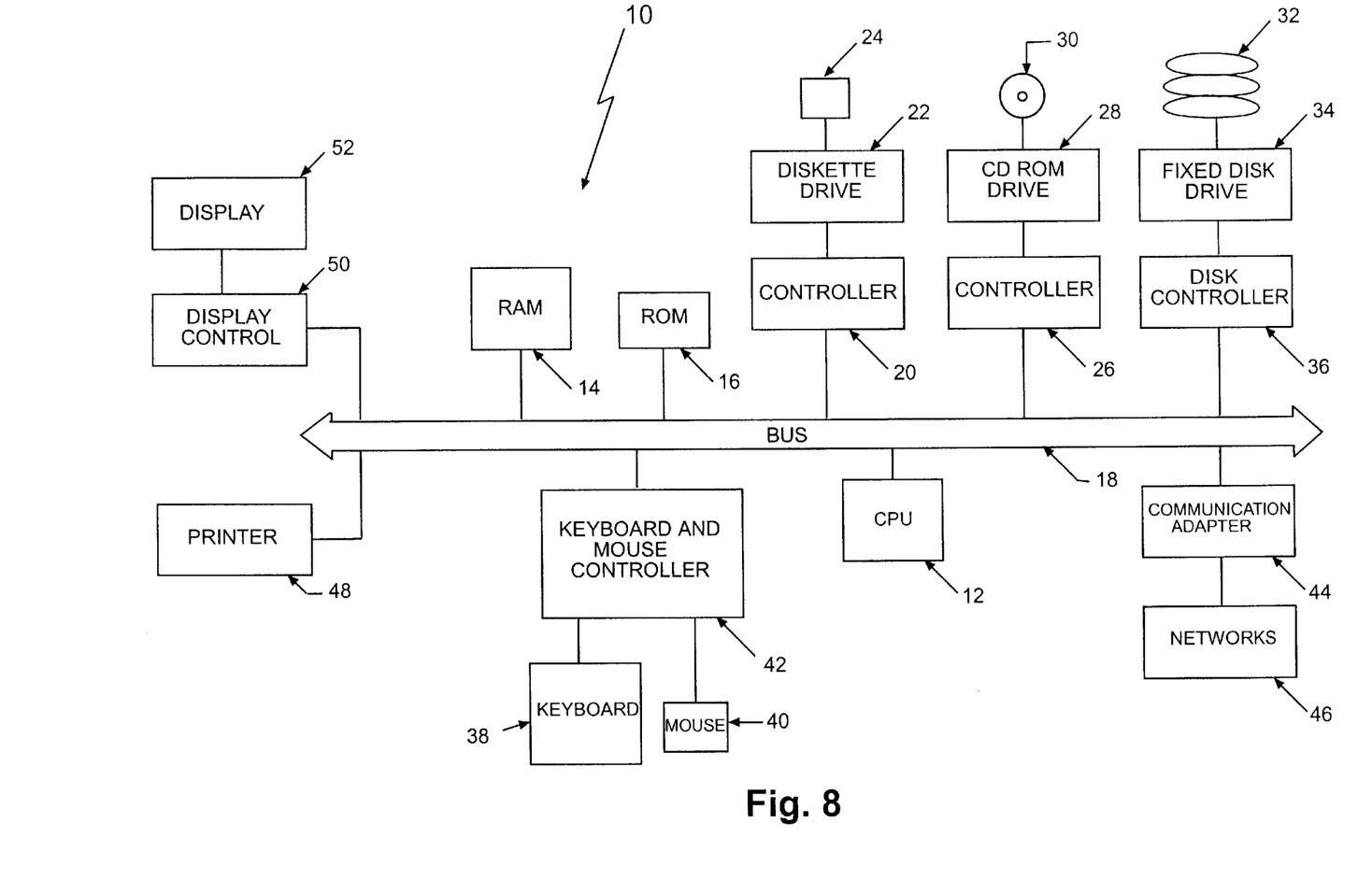
FIG. 8 is a block diagram of a computer system suitable for use with the present invention.

FIG. 8 is a block diagram of a computer system which contains components on which embodiments of the invention may be implemented. The computer system, identified generally by reference numeral 10, may be of any suitable type and represents a typical environment in which the invention may be practiced. By way of example, computer system 10 may be a main frame or personal computer, the latter of which may be of the IBM® compatible or Macintosh® type. Although the description may refer to terms commonly used in connection with particular computer systems, the description and concepts equally apply to other systems, including systems having different architectures from that shown in FIG. 8. Moreover, the functions of one or more of the hardware components in computer system 10 may be implemented in a wide variety of ways including discrete logic components, one or more ASICs and/or program-controlled processors.

Referring to FIG. 8, computer system 10 comprises a central processing unit (CPU) 12 which may a conventional microprocessor, random access memory (RAM) 14 for temporary storage of information, and read only memory (ROM) 16 for permanent storage of information. Each of these components is coupled to a bus 18. Operation of the computer system 10 is typically controlled and coordinated by operating system software. The operating system, which is embodied in the system memory and runs on CPU 12 coordinates the operation of the other components of the computer system 10. More particularly, the operating system controls allocation of system resources and performs many tasks, such as processing, memory management, networking and I/O functions, among other things.

Also coupled to bus 18 by a controller 20 is a diskette drive 22 into which a non-volatile mass storage device such as a diskette 24 may be inserted. Similarly, a controller 26 interfaces between bus 18 and a compact disc (CD) ROM drive 28 which is adapted to receive a CD ROM 30. A hard disk 32 is provided as part of a fixed disk drive 34 which is coupled to bus 18 by a disk controller 36.

Computer system 10 may include a variety of I/O devices as well. A keyboard 38 and mouse 40, both of which are coupled to bus 18 via a controller 42 enable a user to control the transfer of information and data into and out of computer system 10 and to otherwise manipulate and control computer system 10 and its components. A communications adapter 44 enables computer system 10 to be connected to one or more networks 46 which may include the internet. This connection provides another way in which data and software may be transferred to and from computer system 10. Computer system 10 may also include a printer 48 to render paper copies of processed computer data.

In accordance with the invention, computer system 10 further includes a display control 50 which is coupled to bus 18 and which provides an interface to display 52.

Figure 9:
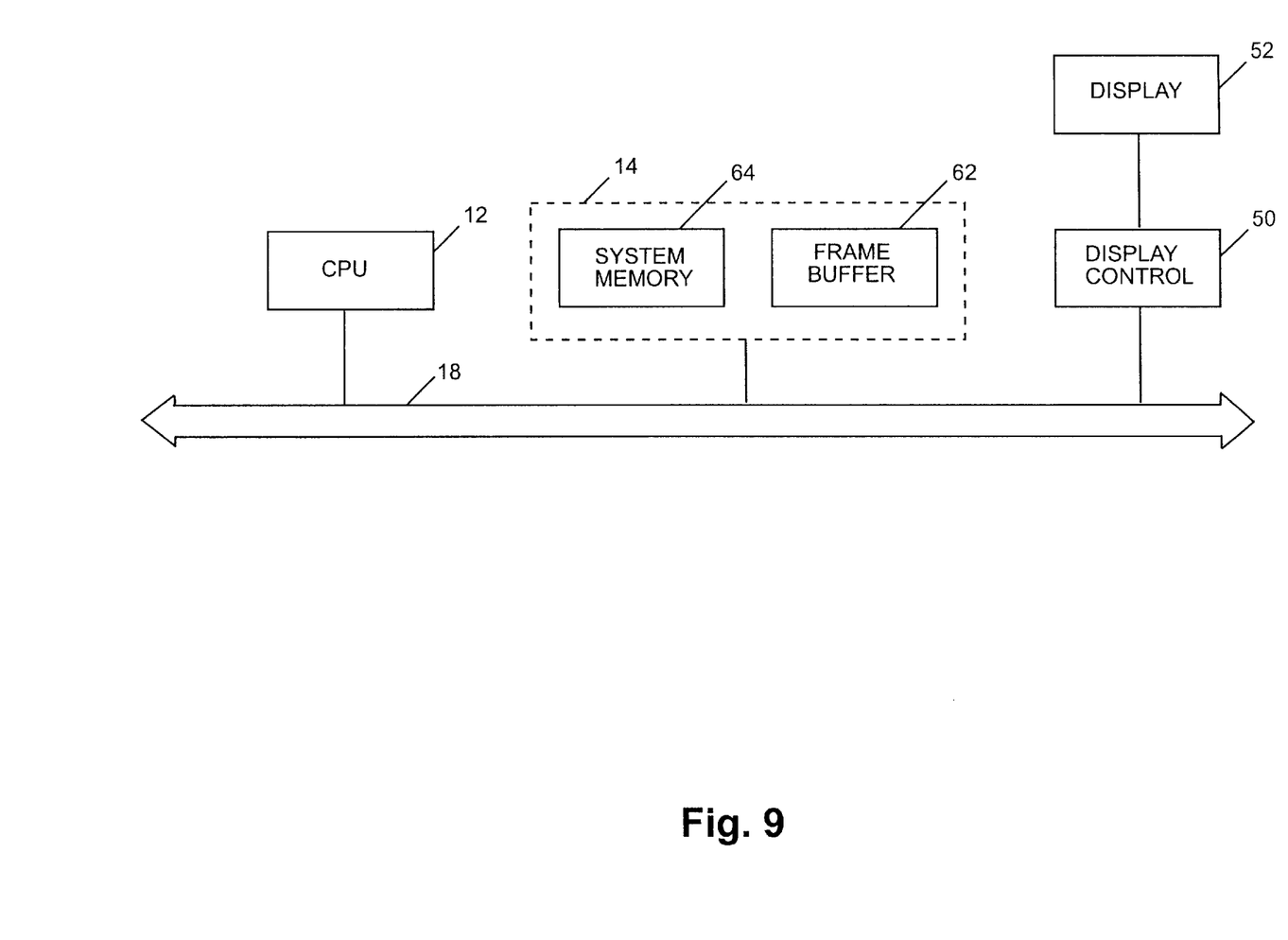
FIG. 9 is a block diagram illustrating one embodiment of a display subsystem for implementing the present invention.

FIG. 9 illustrates one embodiment of a display subsystem in which CPU 12 builds a pixelized representation of an image in frame buffer 62 using programs and data stored in system memory 64. Both frame buffer 62 and system memory 64 are allocated in RAM 14. Display control 50 displays an image on display 52 that is defined by the information stored in frame buffer 62. In such an embodiment, the present invention may be implemented entirely in software executed by CPU 12. In an alternative embodiment, display control 50 accesses frame buffer 62 directly along a path not illustrated rather than through bus 18.

Figure 10:
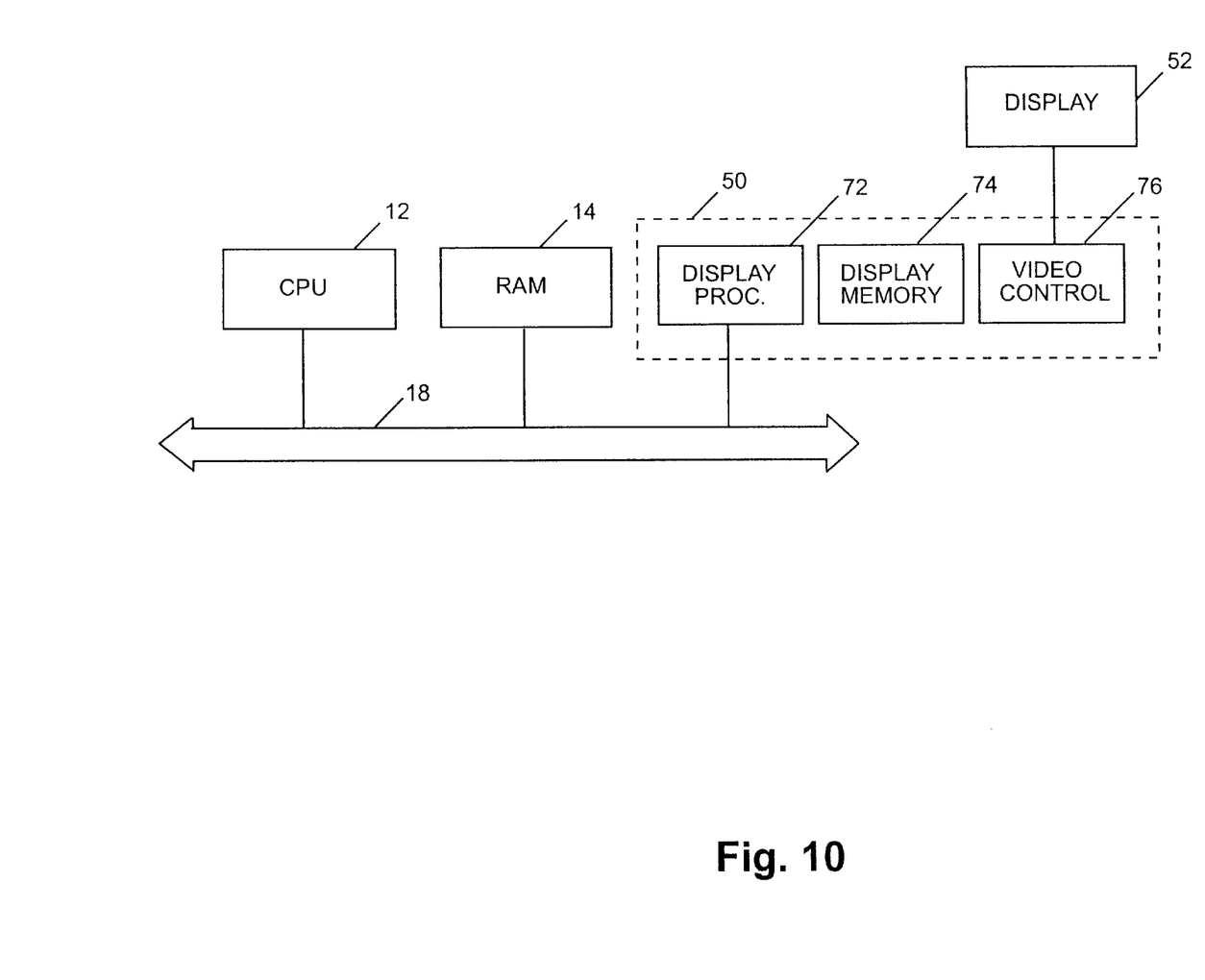
FIG. 10 is a block diagram illustrating another embodiment of a display subsystem for implementing the present invention.

FIG. 10 illustrates another embodiment of a display subsystem in which display processor 72 builds a pixelized representation of an image in a frame buffer within display memory 74 in response to data and commands received from bus 18. Video control 76 displays an image on display 52 that is defined by the information stored in the frame buffer within display memory 74. In such an embodiment, the present invention may be performed entirely by display processor 72.

Many variations including a hybrid of the embodiments illustrated in FIGS. 9 and 10 are possible. For example, portions of the present invention may be carried out by special hardware such as display processor 72 and other portions may be carried out by CPU 12. Furthermore, all or part of the present invention may be carried out within the process that generates signals sent to display 52 by manipulating information as it is obtained from the frame buffer. As these examples show, no particular architecture is critical to the practice of the present invention. In preferred embodiments, however, the present invention is carried out within one or more processes that are responsible for constructing and storing pixel representations into a frame buffer.

As will be appreciated by those skilled in the art, FIGS. 9 and 10 are schematic illustrations that omit a variety of features such as buffers, registers, latches, clocks and controllers that are used in many practical implementations. These features, which are not essential to either understand or practice the present invention, are omitted from the figures for the sake of clarity.

While the invention has been described in conjunction with specific embodiments, it will be evident to those skilled in the art in light of the foregoing description that many further alternatives, modifications and variations are possible. Thus, the invention described herein is intended to embrace all such alternatives, modifications, applications and variations as may fall within the spirit and scope of the appended claims.

What is claimed is:

1. A method for selecting a mipmap level for each pixel in an object comprising the steps of:

calculating, for the entire object, in world coordinate space, a binding anisotropy coefficient;

calculating a first value as a minimum of a function that defines a mipmap level for the entire object as a function of a viewing transformation angle;

assigning a value of the function as the first value, if the binding anisotropy coefficient is larger than a critical number such that the binding anisotropy is so high there is no practical solution to minimize;

calculating an angle of viewing transformation, if the binding anisotropy coefficient is smaller than the critical number;

calculating a second value indicative of a current mipmap level;

calculating, for each scanline, an inverse of a first homogeneous coordinate of the corresponding scanline and an inverse of a last homogeneous coordinate of the corresponding scanline;

calculating, for each pixel of each scanline, an inverse homogeneous coordinate by interpolating the inverse of the first homogeneous coordinate of the corresponding scanline and the inverse of the last homogeneous coordinate of the corresponding scanline; and calculating the level of the mipmap as a function of at least the calculated inverse homogeneous coordinates.

2. The method according to claim 1, wherein said object is a polygon.

3. The method according to claim 1, wherein said object is a triangle.

4. The method according to claim 1, wherein the level of the mipmap d is calculated as follows:

$$d = C((\alpha) - C_1 \log(q),$$

wherein $C(\alpha)$ is a function of the viewing transformation angle $\alpha$, $C_1$ is the second value, and q is the inverse homogenous coordinate.

5. The method according to claim 1, wherein the level of the mipmap d is calculated as follows:

$$d = tB_0 + (1-t)B_1 - C_1 \log(q),$$

wherein t is a normalized interpolation parameter between 0 and 1, $B_0$ and $B_1$ represent respective mipmap levels for the entire object at selected viewing transformation angles $\alpha$, and q is the inverse homogenous coordinate.

6. The method according to claim 1, wherein the level of the mipmap d is calculated as follows:

$$d = C(\min(w_0, \ldots, w_n)/\max(w_0, \ldots, w_n)) - C_1 \log(q),$$

wherein $w_0, \ldots, w_n$ are homogenous coordinates of the object's vertices $0, 1, \ldots, n$, $C_1$ is the second value, and q is the inverse homogenous coordinate.

7. The method according to claim 1, wherein the level of the mipmap d is calculated as follows:

$$d = (\min(w_0, w_1, w_2)/\max(w_0, w_1, w_2))B_0 + (1 - \min(w_0, w_1, w_2)/\max(w_0, w_1, w_2))B_1 - C_1 \log(q),$$ wherein $w_0, w_1, w_2$ are homogenous coordinates of the object's vertices 0, 1, 2, $B_0$ and $B_1$ represent respective mipmap levels for the entire object at selected viewing transformation angles $\alpha$, $C_1$ is the second value, and q is the inverse homogenous coordinate.

8. A computer program product having computer readable program code embodied therein for causing a computer to select a mipmap level for each pixel in an object, said computer program product comprising:

program code for calculating, for the entire object, in world coordinate space, a binding anisotropy coefficient;

program code for calculating a first value as a minimum of a function that defines a mipmap level for the entire object as a function of a viewing transformation angle;

program code for assigning a value of the function as the first value, if the binding anisotropy coefficient is larger than a critical number such that the binding anisotropy is so high there is no practical solution to minimize;

program code for calculating an angle of viewing transformation, if the binding anisotropy coefficient is smaller than the critical number;

program code for calculating a second value indicative of a current mipmap level;

program code for calculating, for each scanline, an inverse of a first homogeneous coordinate of the corresponding scanline and an inverse of a last homogeneous coordinate of the corresponding scanline;

program code fbr calculating, for each pixel of each scanline, an inverse homogeneous coordinate by interpolating the inverse of the first homogeneous coordinate of the corresponding scanline and the inverse of the last homogeneous coordinate of the corresponding scanline; and program code for calculating the level of the mipmap as a function of at least the calculated inverse homogeneous coordinates.

9. A computer system comprising a processor, random access memory coupled to said processor, and a display coupled to said processor, wherein said processor executes program instructions stored in said random access memory causing said computer system to:

calculate, for the entire object, in world coordinate space, a binding anisotropy coefficient;

calculate a first value as a minimum of a function that defines a mipmap level for the entire object as a function of a viewing transformation angle;

assign a value of the function as the first value, if the binding anisotropy coefficient is larger than a critical number such that the binding anisotropy is so high there is no practical solution to minimize;

calculate an angle of viewing transformation, if the binding anisotropy coefficient is smaller than the critical number;

calculate a second value indicative of a current mipmap level;

calculate, for each scanline, an inverse of a first homogeneous coordinate of the corresponding scanline and an inverse of a last homogeneous coordinate of the corresponding scanline;

calculate, for each pixel of each scanline, an inverse homogeneous coordinate by interpolating the inverse of the first homogeneous coordinate of the corresponding scanline and the inverse of the last homogeneous coordinate of the corresponding scanline; and calculate the level of the mipmap as a function of at least the calculated inverse homogeneous coordinates.

10. An apparatus for selecting a mipmap level for each pixel in an object, said apparatus comprising:

means for calculating, for the entire object, in world coordinate space, a binding anisotropy coefficient;

means for calculating a first value as a minimum of a function that defines a mipmap level for the entire object as a function of a viewing transformation angle;

means for assigning a value of the function as the first value, if the binding anisotropy coefficient is larger than a critical number such that the binding anisotropy is so high there is no practical solution to minimize;

means for calculating an angle of viewing transformation, if the binding anisotropy coefficient is smaller than the critical number;

means for calculating a second value indicative of a current mipmap level;

means for calculating, for each scanline, an inverse of a first homogeneous coordinate of the corresponding scanline and an inverse of a last homogeneous coordinate of the corresponding scanline;

means for calculating, for each pixel of each scanline, an inverse homogeneous coordinate by interpolating the inverse of the first homogeneous coordinate of the corresponding scanline and the inverse of the last homogeneous coordinate of the corresponding scanline; and means for calculating the level of the mipmap as a function of at least the calculated inverse homogeneous coordinates.

* * * * *